L. ONDERDONK.
OVERSEAMING SEWING MACHINE.
APPLICATION FILED AUG. 4, 1910.

1,201,084.

Patented Oct. 10, 1916.
9 SHEETS—SHEET 2.

Fig. 2.

WITNESSES
Albert Popkins
Mary W. Hammer

INVENTOR
Lansing Onderdonk
By Sturtevant Mason
Attorneys

L. ONDERDONK.
OVERSEAMING SEWING MACHINE.
APPLICATION FILED AUG. 4, 1910.

1,201,084.

Patented Oct. 10, 1916.
9 SHEETS—SHEET 7.

UNITED STATES PATENT OFFICE.

LANSING ONDERDONK, OF NEW YORK, N. Y., ASSIGNOR TO UNION SPECIAL MACHINE COMPANY, OF CHICAGO, ILLINOIS, A CORPORATION OF ILLINOIS.

OVERSEAMING SEWING-MACHINE.

1,201,084.  Specification of Letters Patent.  Patented Oct. 10, 1916.

Application filed August 4, 1910. Serial No. 575,589.

*To all whom it may concern:*

Be it known that I, LANSING ONDERDONK, a citizen of the United States, residing at New York, in the county of New York, State of New York, have invented certain new and useful Improvements in Overseaming Sewing-Machines, of which the following is a description, reference being had to the accompanying drawing and to the letters and figures of reference marked thereon.

My invention relates to new and useful improvements in overseaming sewing machines, and more especially to overseaming machines of the type known in the art as glove sewing machines, although it will be obvious from certain aspects of the invention, that parts thereof may be used in other types of machines.

An object of the invention is to provide a machine of the above character, which is especially adapted for high speed. To this end, I have provided a system of levers, links and eccentrics, which are positively connected together for giving to the needle bar and the looper their various movements.

A further object of the invention is to reduce to a minimum, the operating parts for the looper, whereby the wear on the parts of the machine is reduced, and the operating mechanism simplified.

The invention further consists in various details of construction hereinafter described and pointed out in the appended claims.

In the drawings, which show by way of illustration one embodiment of the invention, Fig. 13 is a side view of the machine, with certain parts broken away.

The machine as herein illustrated, consists of a box framework, which houses the operating parts for the needle, looper and feeding mechanism. The needle moves back and forth in a horizontal plane, and the looper is given six motions, so as to carry the looper into the needle loop on one side of the line of feed; then over the line of feed to the other side thereof, where it is moved back to withdraw the looper from the needle loop.

*The feeding mechanism.*—The feeding mechanism, as herein shown, consists of two feed wheels or cups, 1 and 2. The feed wheel 1 is mounted in a bracket 3 secured to the box-like framework 4. The feed wheel 1 is mounted on a vertical shaft, carrying at its lower end the friction ring 5, which is engaged by friction clutches 6, carried by an oscillating lever 7. The oscillating lever 7 extends through a slot in the frame or casing 4, and is connected at its free end to a link 8, which in turn extends out through the side of the casing 4, and is pivoted at 9 to a slotted lever 10, fulcrumed at 11 on a bracket carried by the frame or casing 4. The lever 10 has an arm extending to the inside of the casing 4, where it is pivoted at 12 to a link 13, which in turn coöperates with an eccentric mounted on the main shaft 14, which extends horizontally through the frame or casing 4, and is mounted in suitable bearings carried thereby. A driving wheel is mounted on each end of the shaft 14, as is common in this type of machine.

It will be obvious that as the main shaft rotates, the link 13 will vibrate the lever 10, which in turn through the link 8 will vibrate the clutch lever 7, thus imparting an intermittent rotating movement to the feed wheel or cup 1.

Figure 1:
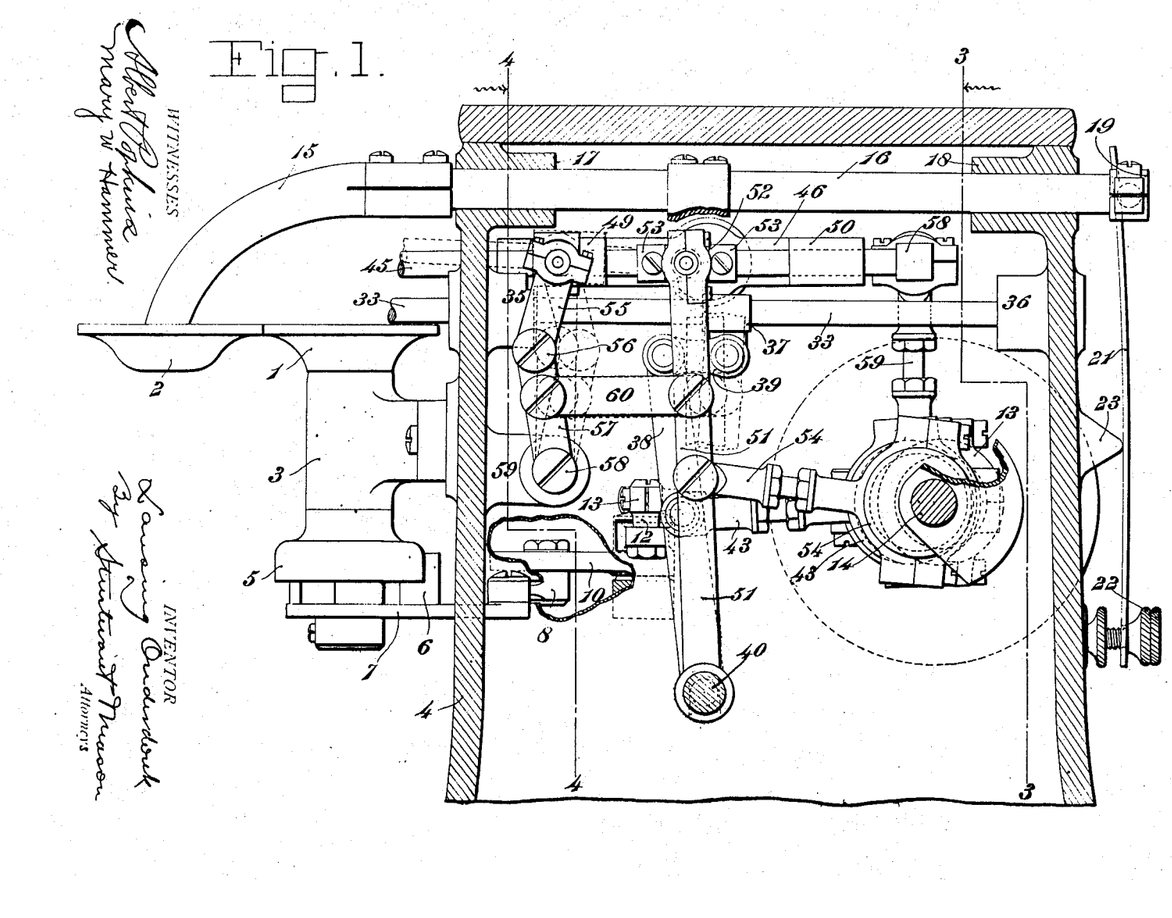
Figure 1 is a sectional view through the casing, on the line 1—1 of Fig. 3, showing the operating parts in side elevation.
Figure 2:
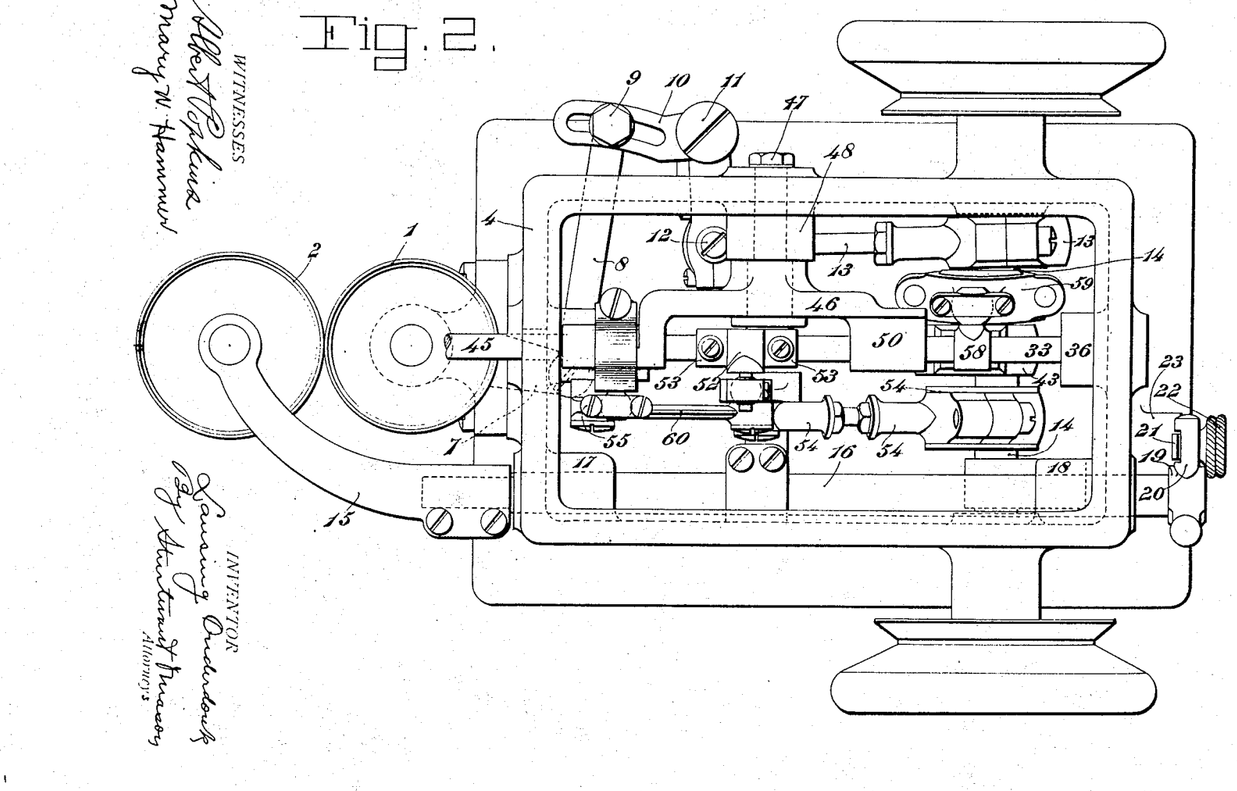
Fig. 2 is a top plan view, with the top of the machine removed, showing the operating parts in plan.
Figure 14:
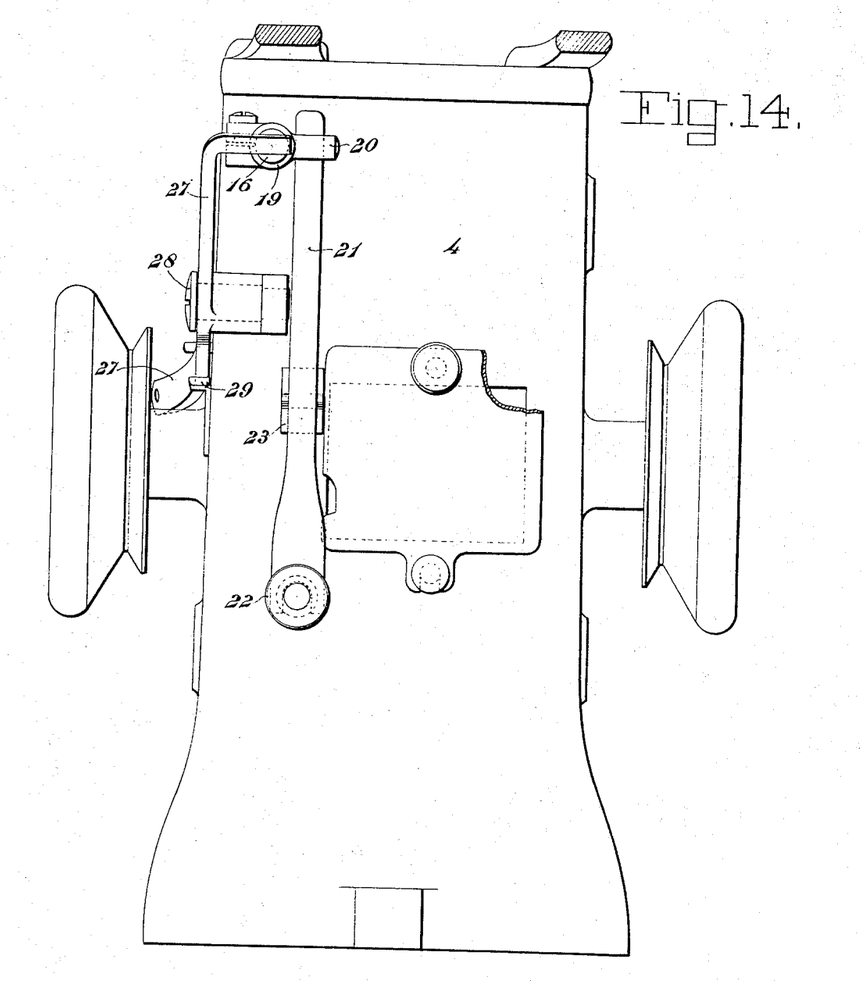
Fig. 14 is a rear view of the machine.

The feed wheel or cup 2 is carried by an arm 15, which is attached to the end of a bar 16, mounted to reciprocate in bearings 17 and 18 formed in the frame or casing 4. The bar 16 carries a collar 19 at its rear end, which is provided with a projecting arm 20. A spring 21 is forked at its lower end to straddle an adjustable screw 22, and intermediate its end said spring bears against a fulcrum block 23, carried by the casing 4. (See Figs. 1 and 14.)

The spring 21 normally tends to hold the bar 16 drawn within the casing, and the feed wheel or cup 2 in contact with the feed wheel or cup 1. The feed wheel 2, as herein shown, receives its movements through its contact with the fabric being stitched. It is obvious, however, that said feed wheel may be positively driven from the shaft operating the feed wheel 1, in the manner well known in this art.

As a means for moving the feed wheel 2 away from the feed wheel 1 to insert the work, I have provided the usual hand lever 24, which is pivoted at 25 to the casing of the machine, and coöperates with a projecting arm 26, carried by the arm 15 which supports the feed wheel 2. It is sometimes desirable to move the feed wheel 2 away from the feed wheel 1, by means of a treadle, and in order to accomplish this, I have provided a lever 27, which is fulcrumed at 28 on a bracket carried by the casing, and said lever at its upper end extends into the path of movement of the bar 16, so that when the said lever is depressed by a treadle connection, the bar 16 is moved to carry the feed wheel 2 away from the feed wheel 1. A spring 29 operates to hold the lever 27 with its upper end out of contact with the bar 16. A pin 30 limits the upward movement of the lever 27.

*Needle mechanism.*—The needle 31 (see Fig. 5) is clamped in the needle head 32, carried by the needle bar 33. Said needle is mounted so as to reciprocate in a horizontal plane back and forth across the upper edges of the feed wheels 1 and 2. The arm 15 supporting the feed wheel 2, has a slotted needle guide 34, which is of the usual construction in this type of machine.

The needle bar 33 (see Fig. 1) reciprocates in bearings 35 and 36. A collar 37 is secured to the needle bar intermediate its ends, and said collar 37 is secured to a lever 38 by means of a link 39. The lever 38 at its lower end is pivoted to a rod 40, which extends across the casing and is mounted in bearings 41 and 42, carried thereby, (see Fig. 3). The lever 38 is pivoted intermediate its ends to an eccentric rod 43, which engages an eccentric on the main shaft 14. As the main shaft rotates, the lever 38 will be rocked back and forth about its pivotal connection with the rod 40, and in turn will impart to the needle bar 33, a reciprocating movement.

*Looper mechanism.*—The looper 44 (see Fig. 5) is mounted in the end of a looper-carrying rod 45. Said looper 44 is of the type usual in this character of machine, and has its forward end bent substantially at right angles to the shank, so that it may move back and forth into the needle loop. The looper has the usual eyes for receiving a thread.

The looper-carrying rod 45 is mounted so as to reciprocate in a pivoted yoke 46. The said yoke is carried by a pivot bolt 47, which extends through a bearing 48 located substantially midway between the ends of the looper carrying rod 45. Said yoke 46 has spaced bearings 49 and 50, in which the looper-carrying rod reciprocates. The looper is reciprocated back and forth in the yoke by means of a lever 51. Said lever 51 is connected at its upper end to a collar 52, which is loosely mounted between bearings 53 secured to the looper-carrying rod. Said collar 52 carries a stud which projects through a ball loosely mounted in the upper end of the lever 51. This connection allows the collar to oscillate on the looper-carrying rod, and said rod to move up and down relative to the lever. The lateral movements of the collar due to the oscillation of the lever 51 are imparted to the looper-carrying rod. The lever 51 is pivoted at its lower end to the bar 40. The lever 51 is oscillated about its fulcrum connection with the rod 40, by an eccentric rod 54, which coöperates with an eccentric carried by the main shaft 14. The above described mechanism will impart a back and forth movement to the looper-carrying rod, which moves the looper from one side of the line of feed to the other side thereof.

When the looper moves from one side of the line of feed to the other, it is necessary to lift it over the edge of the material. This is accomplished by oscillating the yoke 46 about its pivotal connection with the casing. As a means for oscillating the yoke, I have provided a link 55, which is pivoted at one end to the bearing 49 carried by the yoke 46. Said link 55 at its other end is pivoted at 56 to a lever 57, which is fulcrumed at 58 on a bracket 59, carried by the frame or casing 4.

The lever 57 is connected by a link 60 to the lever 51, so that as the lever 51 is oscillated back and forth by the eccentric on the main shaft, the lever 57 will also be oscillated back and forth on its fulcrum 58. The pivotal connection 56 between the lever 57 and the link 55 is so disposed that said pivotal connection will move from one side of a vertical line passing through the fulcrum 58 of the lever and the pivotal connection between the link 55 and the bearing 49, to the other side of said vertical line.

It will thus be seen that for one reciprocation of the lever 51 and the lever 57, the yoke 46 will be moved up and down. As the looper, therefore, moves from a position on one side of the line of feed, it will be raised over the fabric and lowered again on the other side of the fabric.

In order that the looper may be moved into and out of the needle loop, I have provided the looper-carrying rod with an arm 58, which is mounted on the extreme rear end of the looper-carrying rod 45. Said arm carries a ball on its outer end which in turn is connected with an eccentric strap 59, coöperating with an eccentric mounted on the main shaft 14. As the shaft 14 rotates, the eccentric strap 59 will swing the arm 58, thus imparting an oscillation to the looper-carrying rod, which in turn will carry the looper into and out of the needle loop and move the same back and forth, so as to position the looper, whereby the needle may pass between the body of the looper and the looper thread.

Figures 7, 8, 15:
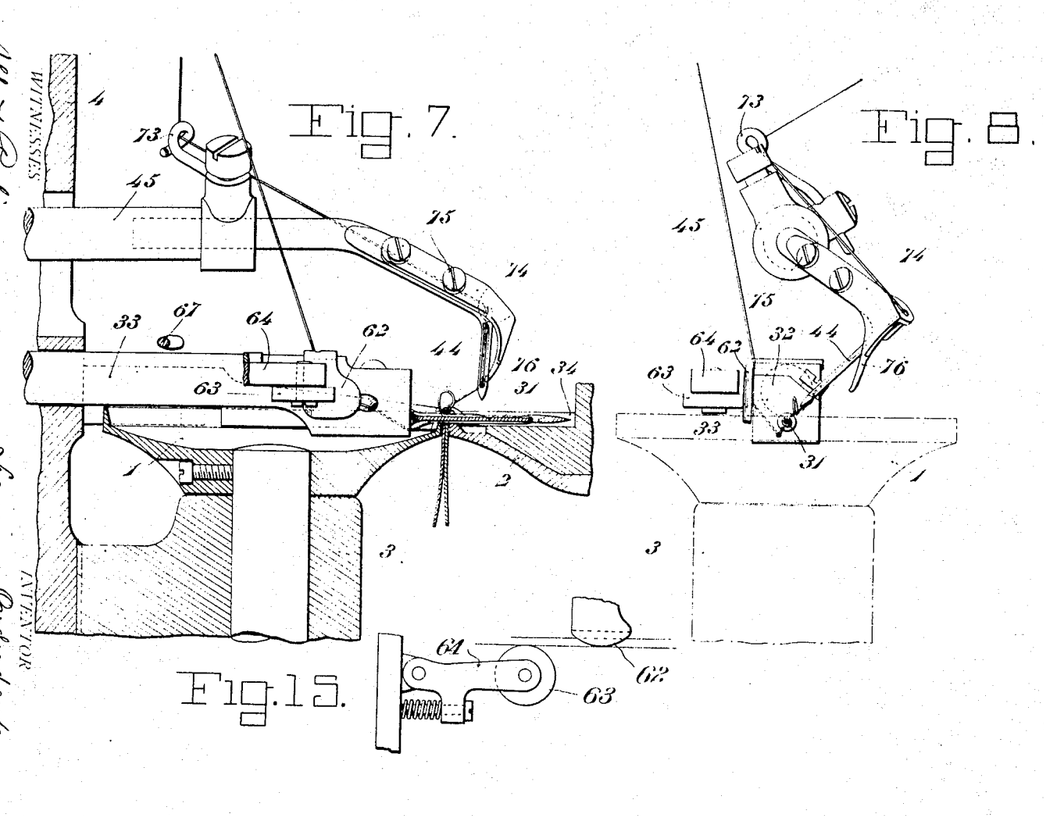
Fig. 7 is a view partly in section, showing the position of the needle and looper when the needle reaches the extreme end of its stroke.
Fig. 8 is an end view of the needle and looper, in the position shown in Fig. 7.
Fig. 15 is a detail view showing in plan the thread-clamp and operating part therefor.
Figure 9:
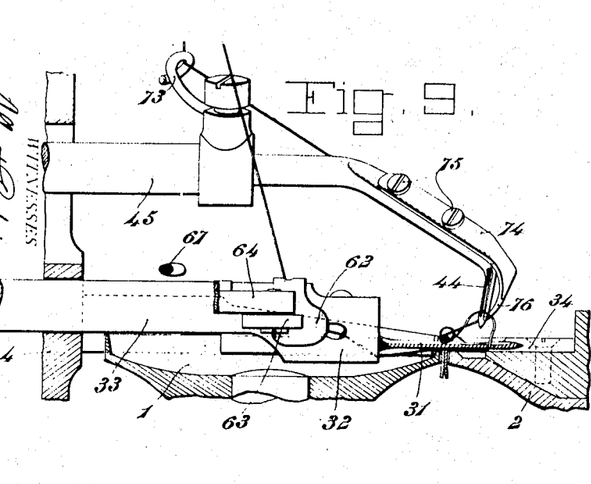
Fig. 9 is a view similar to Fig. 7, showing the looper about to enter the needle loop.
Figure 10:
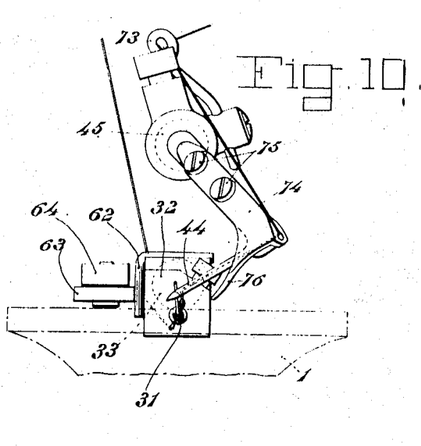
Fig. 10 is an end view of the needle and looper, in the position shown in Fig. 9.
Figure 11:
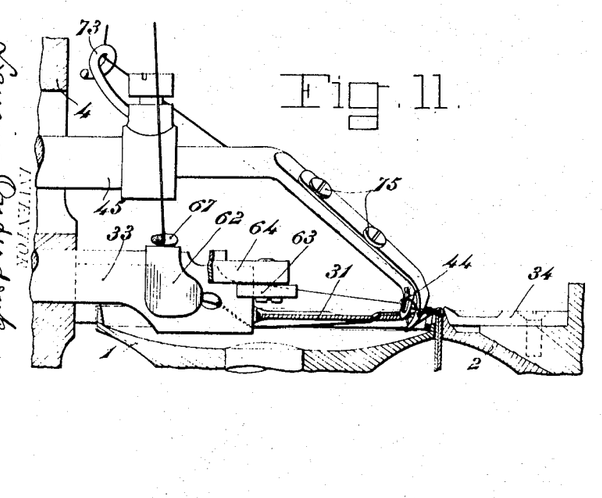
Fig. 11 is a view similar to Fig. 7, with the looper in position for the needle to pass between the looper thread and the looper body.
Figure 12:
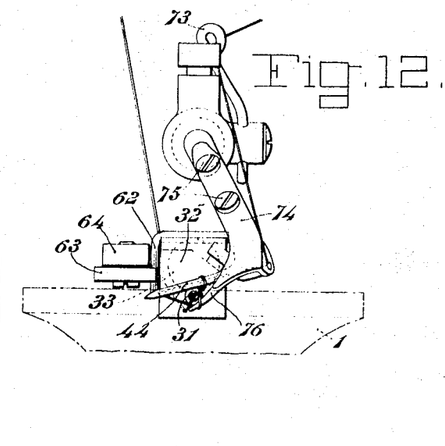
Fig. 12 is an end view of the needle and looper in the position shown in Fig. 11.

*Needle thread controlling mechanism.*— The needle thread is led from the supply spool 60 through a thread guide mounted on the top of the casing; thence through a suitable tension to a thread-guiding eye 61, carried by the casing. From the thread-guiding eye 61 (see Fig. 5), the thread passes through a thread clamp 62, carried by the needle head, and thence to the eye of the needle. The thread clamp is operated to clamp the thread by means of a roller 63, carried by a bracket arm 64, pivoted at 65 to the casing, and yieldingly pressed forward to engage the thread clamp by means of a spring 66. When the needle bar is fully retracted, the needle thread is brought into contact with an arm 67, carried by an adjustable plate 68 mounted on the bracket arm 64. The outer face of the thread clamp 62 is oval, as shown in Fig. 15. The spring 66 surrounds a bolt 66ª, which passes through an elongated opening in the bracket arm 64. By adjusting the screw 66ª, the movement of the roller 63 toward the thread clamp is limited. The curved face of the thread clamp will, therefore, engage the roller 63 at varying periods, as the screw 66ª is adjusted. By the adjustment of the screw 66ª, the time at which the needle thread is clamped is varied. When the needle moves forward into the material, the thread clamp 62 will be brought into contact with the roller 63, and the needle thread clamped so that the needle in the latter part of its stroke, will draw up the previous needle loop, which at this time is dropped from the looper. When the needle reaches the rear end of its stroke, the needle thread will engage the arm 67 and the previous stitch will be drawn tight.

Figures 5, 6, 16, 17, 18, 19:
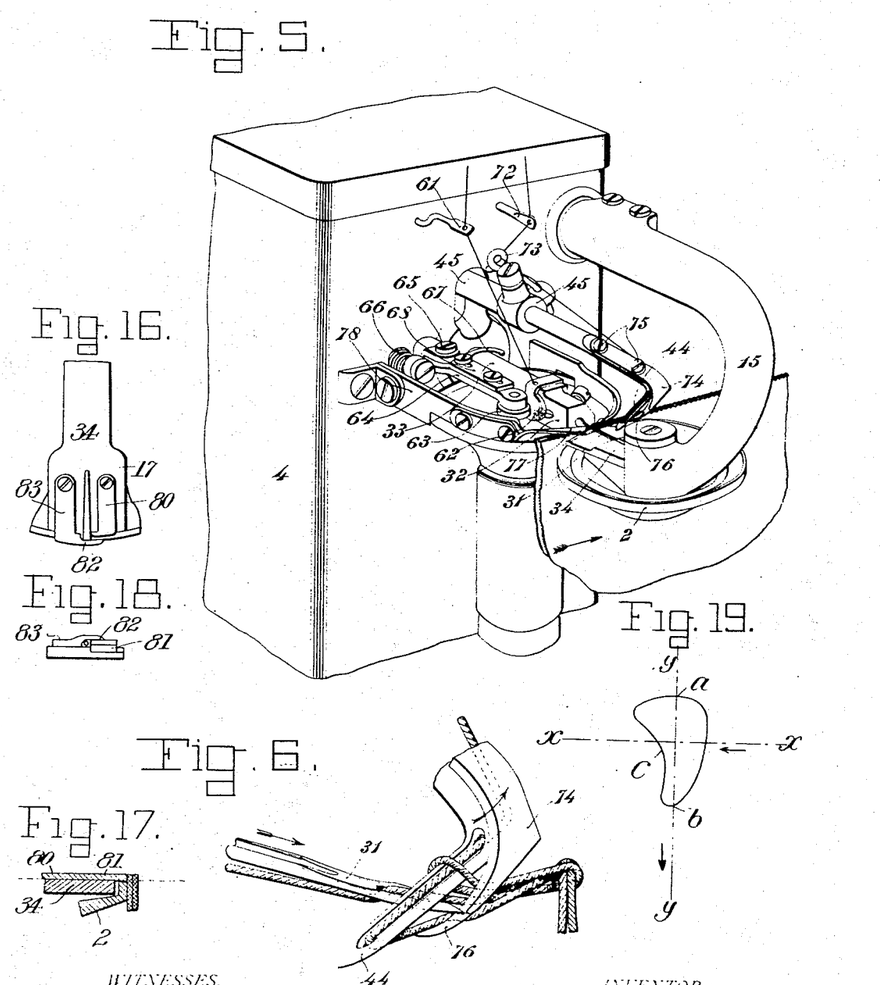
Fig. 5 is a perspective view of the parts adjacent the stitching point.
Fig. 6 is an enlarged perspective view, showing the needle entering the looper thread loop.
Fig. 16 is a modification showing in plan the needle guide, a stitch finger and fabric rest.
Fig. 17 is a longitudinal sectional view through the needle guard.
Fig. 18 is a face view of part shown in Fig. 16.
Fig. 19 shows diagrammatically the path of movement of the looper point.

*Looper-thread operating mechanism.*— The looper thread is led from the supply spool 69 through a guiding eye 70, and a suitable tension 71, to a second thread-guiding eye 72, carried at the front of the casing. From the thread-guiding eye 72 (see Fig. 5,) the looper thread passes through the guiding eye 73 on the looper-carrying rod, and thence through the eyes of the looper. As the looper is oscillated, so as to be withdrawn from the needle loop, the thread-guiding eye 73 moves away from the thread guide 72, thus drawing up slightly on the looper thread. The looper thread may be threaded through the eye 72, then through the guiding eye 73 on the looper-carrying rod, and then back through the eye 72, and from the eye 72 to the looper. By this threading, more looper thread is pulled through the tension. By threading the thread double through the guiding eye 73, as above noted, and adjusting the arm 67 so as to pull off very little if any needle thread when the needle bar moves back, a whip stitch may be formed, that is, a stitch in which the looper thread extends from the needle puncture on one side around the edge to the needle puncture on the other side of the fabric. By threading the machine as shown in Fig. 5, and setting the arm 67 so as to pull off more needle thread, a purl stitch may be formed, that is, a stitch wherein the needle loops and looper thread loops interlock at the edge of the fabric.

As a further means for controlling the looper thread, or rather for positioning the looper thread so that the needle will with certainty pass between the body of the looper and the looper thread as it moves forward into the material, I have provided a looper thread deflector 74, which as herein shown, is secured to the shank of the looper by the screws 75. Said deflector has a forwardly projecting finger 76, which extends in the general direction of the body of the looper, and is spaced slightly therefrom, (see Fig. 6). When the looper moves forward into the needle loop, said deflector secures no function. When, however, the looper is carried over the edge of the fabric, and lowered so as to position itself for the needle, the finger 76 of said deflector engages the looper thread, depressing the same, together with the needle loop of the previous stitch surrounding the looper, so as to hold the looper thread away from the body of the looper and form a proper space so that the needle will enter with certainty between the looper thread and the body of the looper. Said needle as it moves forward moves over the top of the deflecting finger 76, and between the same and the body of the looper, as clearly shown in Fig. 6. Said finger, however, is spaced a sufficient distance at its free end from the looper, so that said looper and said finger may be retracted, leaving the looper thread loop on the needle.

*Edge guide for fabric.*—In order to guide the upper edge of the fabric and hold the same in proper position relative to the needle, I have provided an edge guide 77, which is secured to a bracket 78, mounted on the frame or casing 4. Said edge guide 77 extends along the inner face of the feed wheel or cup 1, and is bent over the edge of cup 2, so as to extend over the edge of the fabric passing through the machine. Said guide is cut away at the stitching point, in order to provide sufficient room for the operation of the stitch-forming mechanism.

In certain classes of work, such as stitching knitted fabrics, it is desirable to provide a fabric rest to support the material against the thrust of the needle. It is also desirable in this class of work to provide a stitch finger over which the stitches may be formed. In Figs. 16 17 and 18, I have shown a modified form of construction embodying these features. The needle guide 34 is recessed to receive the shank 80 of the fabric rest 81. This fabric rest extends to a point adjacent the needle path, and has its outer face coincident with the outer face of the feed wheel. The stitch finger 82 is carried by a shank 83, which is also mounted in a recess in the needle guard. The stitch finger extends across the needle path slightly above the same. Said stitch finger also extends over the upper edges of the fabric, and will prevent the same creeping up during the feed of the fabric through the machine.

In the operation of my machine, the toggle levers will raise and lower the looper carrier twice for each oscillation of the looper caused by the eccentric strap 59. By changing the timing of the eccentric operating the strap 59, also the eccentric operating the eccentric rod 54 and the position of the looper carrier, I am able to secure varied differential movements in the looper. In Fig. 19, I have shown diagrammatically the path of movement of the point of the looper. In this figure, x—x indicates the line of feed and y—y indicates the line of reciprocation of the needle. The looper enters the needle loop at the point a, and the needle enters the looper thread loop at the point b. The looper moves forward in substantially a straight path, and is given substantially a dwell while the looper is being moved laterally to position its loop for the entrance of the needle. After the needle point has entered the looper loop, the looper is retracted but slightly at first and is moved laterally, carrying with it the needle loop which is on its shank until the looper is substantially over the fabric edges, or at the point c, Fig. 19, when said looper will be quickly retracted, shedding the needle loop and moving to the rear end of its stroke in position to again move into the needle loop.

Figures 4, 20, 21:
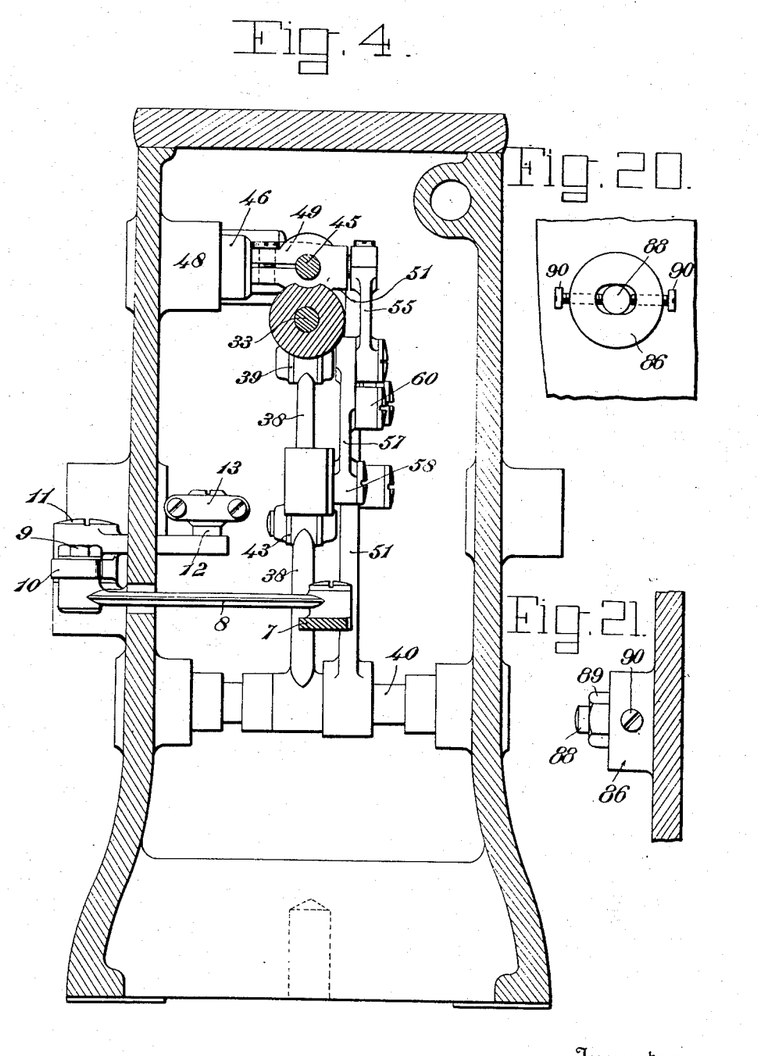
Fig. 4 is a sectional view on the line 4—4 of Fig. 1.
Fig. 20 is a detail showing in side view, the manner of adjusting the looper carrier.
Fig. 21 is a detail showing the manner of supporting the looper carrier stud.

In Fig. 20 I have shown a modified construction whereby the looper carrier may be adjusted. The frame has a hub 86 which is provided with a horizontal slot 87. The looper carrier stud 88 on which the looper carrier is mounted to swing, extends through said slot, and has a locking nut 89. Adjusting screws 90 extending into said hub, engage the sides of the stud 88. By loosening the nut 89, the stud 88 can be moved one way or the other, and held in adjusted positions by the screws 90, 90.

Figures 3, 22, 23, 24:
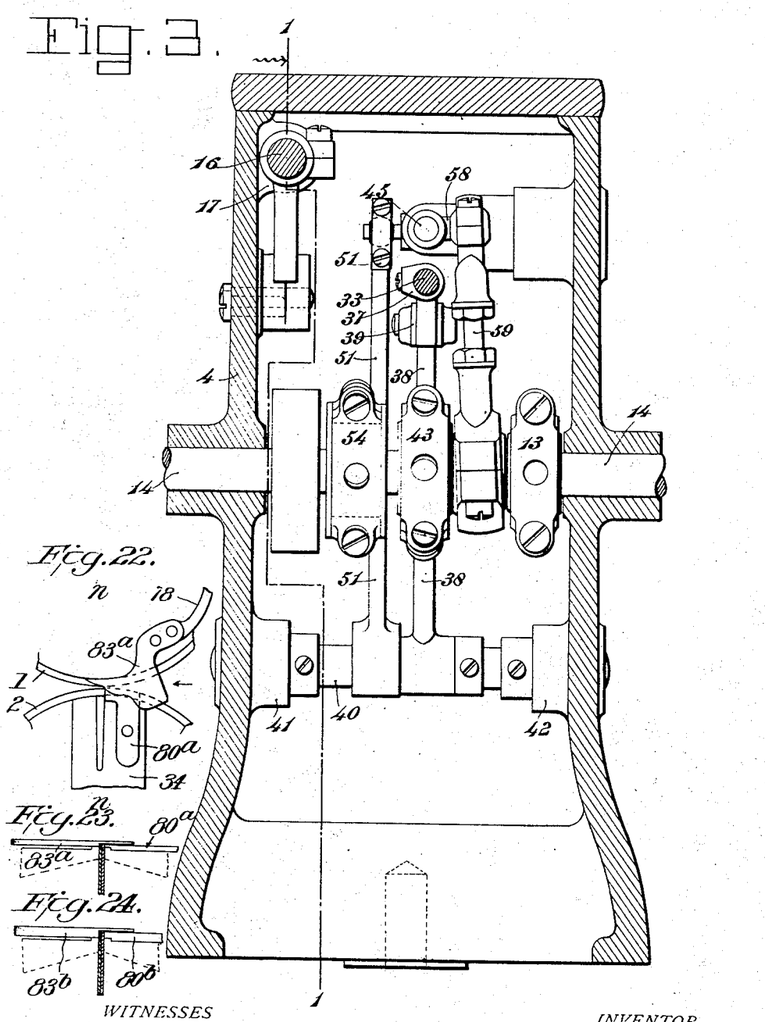
Fig. 3 is a sectional view on the line 3—3 of Fig. 1.
Fig. 22 is a detail in plan, showing a modified form of arrangement of stitch finger.
Fig. 23 is a side view, looking in the direction of the arrow, Fig. 22.
Fig. 24 is a view similar to Fig. 23, showing a fabric rest of different thickness.

In Figs. 22 to 24 inclusive, I have shown a modified form of the arrangement of the stitch finger. As herein shown, the stitch finger 83$^a$ is screwed to the bracket 78, and projects over the feed wheels 1 and 2.

The path of the needle is indicated by the line N—N, Fig. 22. The fabric rest 80$^a$ is carried by the needle-guiding member 34. As shown in Fig. 23, the stitch finger 83$^a$ has a projecting portion which overlaps the fabric support 80$^a$. The stitch finger on its under face, and also the fabric guide, are cut away to afford a passageway for the upper edges of the feed wheels. The fabric passes up between the fabric rest and a shoulder on the stitch finger, and the overlying portion of the stitch finger will prevent the fabric from rising too far.

When it is desired to take a deeper bite into the fabric with the needle, the stitch finger 83$^a$ is removed, and a thicker stitch finger 83$^b$ is substituted therefor. Also a thicker fabric rest 80$^b$ is substituted for the fabric rest 80$^a$, as clearly shown in Fig. 24. This will allow the fabric to extend a greater distance above the edges of the feed wheels and the needle to take a deeper bite therein.

Having thus described my invention, what I claim as new and desire to secure by Letters Patent, is:—

1. The combination of feed wheels, a needle adapted to reciprocate in a horizontal plane above said feed wheels, a needle bar carrying said needle, a lever fulcrumed at one end and having a link connection at its other end to said needle bar, a main shaft, an eccentric carried thereby, an eccentric strap coöperating with said eccentric and pivoted to said lever intermediate its ends.

2. The combination of feed wheels, a needle moving in a horizontal plane above said feed wheels, a needle bar carrying said needle, a vertically disposed lever, a link connecting the upper end of said lever to said needle bar, a fulcrum rod on which the lower end of said lever is pivoted, a main shaft, an eccentric carried by said main shaft, an eccentric strap coöperating with said eccentric and pivoted to said lever intermediate its ends.

3. The combination of a looper, a looper carrying rod, a yoke in which said looper carrying rod reciprocates, means attached to the looper carrying rod intermediate the arms of the yoke for reciprocating said rod in said yoke, means for oscillating the looper rod in the yoke, and means for oscillating said yoke about an axis at right angles to the longitudinal axis of the looper rod.

4. The combination of a looper, a looper carrying rod, a yoke in which said rod is mounted, means attached to the looper carrying rod intermediate the arms of the yoke for reciprocating said rod, means for oscillating said looper rod in said yoke, and means for oscillating the yoke including a toggle lever having its members so disposed as to move first on one side and then the other of a center line passing through the fulcra of the members forming the toggle lever.

5. The combination of a looper, a looper-carrying rod, a yoke in which said rod is mounted, a lever for reciprocating said rod in said yoke, a toggle lever for oscillating said yoke, and means for operating said toggle lever from the means for reciprocating said rod.

6. The combination of a looper, a looper-carrying rod, a pivoted support for said rod, means for reciprocating said rod in said pivoted support, means for oscillating said support, including a toggle lever moving from one side of a vertical line to the other side thereof, and means for oscillating said rod in said support.

7. The combination of a looper, a looper-carrying rod, a support for said looper-carrying rod, means for pivotally mounting said support at a point substantially intermediate the ends of the looper-carrying rod, means connected to said looper-carrying rod at a point substantially coincident with the pivotal point of said support for reciprocating the same, means for oscillating said support, and means for oscillating the looper-carrying rod in said support.

8. The combination of a looper, a looper-carrying rod, a pivoted support in which said looper-carrying rod reciprocates, means for reciprocating said rod including a lever having a pivotal connection with its fulcrum, toggle links connected with said support and adapted to move from one side of a vertical line to another, and a link for connecting said toggle link with said lever.

9. The combination of a looper, a looper-carrying rod, a pivoted support in which said looper-carrying rod reciprocates, means for oscillating said looper-carrying rod in said support, means for reciprocating said rod including a lever having a pivotal connection with its fulcrum, a main shaft, an eccentric carried thereby, an eccentric strap coöperating with said eccentric and pivoted to said lever, a second lever, a link connecting said second lever to said support, and means for oscillating said second lever from said first named lever.

10. The combination of a looper, a looper-carrying rod, a pivoted yoke having spaced bearings in which said looper-carrying rod reciprocates, means connected to the rear end of said looper-carrying rod for oscillating the same, means connected with one of said spaced bearings for oscillating said yoke, and means connected with said looper-carrying rod intermediate the spaced bearings for reciprocating said rod.

11. The combination of a looper, a looper-carrying rod, a pivoted yoke having spaced bearings for supporting said looper-carrying rod, means connected with the rear end of said rod for oscillating the same, a lever connected to said looper-carrying rod intermediate said spaced bearings for reciprocating the same, toggle links connected with one of said bearings for oscillating said yoke, and means for moving said toggle links from one side of a vertical line to the other side of a vertical line.

12. The combination of a looper, a looper-carrying rod, a pivoted yoke having spaced bearings for supporting said looper-carrying rod, means connected with the rear end of said rod for oscillating the same, a lever connected to said looper-carrying rod intermediate said spaced bearings for reciprocating the same, toggle links connected with one of said bearings, for oscillating said yoke, and means for moving said toggle links from one side of a vertical line to the other side of a vertical line, said means including a link connected to the lever for reciprocating the looper-carrying rod.

13. The combination of a needle, means for reciprocating said needle, a thread carrying looper coöperating with the said needle, means for moving said thread carrying looper from one side of the fabric to the other, a thread deflector moving in unison with said looper, and comprising a projecting member extending in the same general direction as the looper and spaced therefrom, said deflector operating to engage the looper thread between the eye of the looper and the material for deflecting the same so that the needle will pass between said looper thread and the body of the looper.

14. The combination of a needle, means for reciprocating said needle in a horizontal line, a thread carrying looper coöperating with said needle on opposite sides of the material, means for moving said thread carrying looper, a thread deflector moving with said looper and comprising a member projecting in the same general direction as the looper and spaced therefrom, said deflector operating to engage the looper thread between the eye of the looper and the material for deflecting the same so that the needle will pass between said looper thread and the body of the looper.

15. The combination of a needle reciprocating in a horizontal line, a thread carrying looper coöperating with said needle on opposite sides of the material, means for moving said thread carrying looper, a deflecting thread finger carried by the looper and extending in the same general direction as the looper and spaced therefrom, said finger being positioned relative to the looper so as to engage the looper thread between the eye of the looper and the material for deflecting said thread so that the needle will pass between the needle thread and the body of the looper.

16. The combination of feed wheels, a needle reciprocating above said feed wheels, a needle bar carrying said needle, a thread clamp carried by said needle bar, yielding means for operating said thread clamp, and a thread arm carried by said yielding means for engaging the needle thread as the same is retracted to set the stitch.

17. The combination of feed wheels, a needle reciprocating above said feed wheels, a needle bar carrying said needle, a thread clamp carried by said needle bar, yielding means for operating said thread clamp, and a thread arm adjustably carried by said yielding means for engaging the needle thread as the needle is retracted to set the stitch.

18. The combination of a looper, a looper carrying rod, a yoke, means for pivotally supporting the yoke between its ends, a bearing carried by each arm of the yoke for supporting the rod, means for oscillating said yoke about an axis at right angles to the axis of the looper supporting rod, and means for reciprocating said rod in said yoke.

19. The combination of a looper, a looper carrying rod, a yoke, means for pivotally supporting the yoke between its ends, a bearing carried by each arm of the yoke for supporting the rod, means for oscillating said yoke about an axis at right angles to the axis of the looper supporting rod, and means attached to said rod between the ends of the yoke for reciprocating the rod in said yoke.

20. The combination of a looper, a looper carrying rod, a yoke for supporting said looper carrying rod, means for pivotally supporting said yoke whereby the same may be oscillated about an axis at right angles to the longitudinal axis of the looper supporting rod, means connected with the looper supporting rod intermediate the arms of the yoke for reciprocating the same, said means having a free connection with the looper supporting rod whereby it may be oscillated, means for oscillating said yoke, and means connected to the rear end of the looper carrying rod for oscillating the same in said yoke.

21. The combination of a looper, a looper carrying rod, a yoke for supporting said looper carrying rod, means for pivotally supporting said yoke whereby the same may be oscillated about an axis at right angles to the longitudinal axis of the looper supporting rod, means connected with the looper supporting rod intermediate the arms of the yoke for reciprocating the same, said means having a free connection with the looper supporting rod whereby it may be oscillated, means for oscillating said yoke, and means connected to the rear end of the looper for oscillating the same in said yoke, said means for oscillating the yoke including a toggle lever, the members of which move from one side to the other of the center line passing through the pivotal supporting points of said members.

22. The combination of a looper, a looper-carrying bar, a yoke in which said looper-carrying bar reciprocates, a pivoted lever for reciprocating said looper-carrying bar, and means connected to said lever for moving said yoke on its pivot.

23. In a cup feed machine of the character described, the combination of a horizontally reciprocating needle, of feed wheels for supporting the fabric in a vertical position, of a stitch finger over which the stitches may be laid, said stitch finger having a lateral projection extending over the edges of the fabric, whereby said fabric is guided and prevented from vertical movement in the feed wheels.

In testimony whereof I affix my signature, in presence of two witnesses.

LANSING ONDERDONK.

Witnesses:
  ROBT. J. MITCHELL,
  J. H. HOWELL.